United States Patent
Arai et al.

(10) Patent No.: US 8,238,385 B2
(45) Date of Patent: Aug. 7, 2012

(54) DATA PROCESSING CIRCUIT AND DATA PROCESSING METHOD

(75) Inventors: Hiroyuki Arai, Gunma-ken (JP); Tetsuya Tokunaga, Gunma-ken (JP); Yasuo Osawa, Gunma-ken (JP); Kensuke Goto, Ashikaga (JP); Yoshiyuki Yamagata, Gunma-ken (JP); Takeshi Kimura, Ashikaga (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 1245 days.

(21) Appl. No.: 11/778,947

(22) Filed: Jul. 17, 2007

(65) Prior Publication Data

US 2008/0019400 A1  Jan. 24, 2008

(30) Foreign Application Priority Data

Jul. 18, 2006  (JP) .................................. 2006-196190
Jul. 18, 2006  (JP) .................................. 2006-196191

(51) Int. Cl.
*H04J 3/04* (2006.01)
(52) U.S. Cl. ....................................................... 370/537
(58) Field of Classification Search .................. 370/503, 370/532, 535, 537; 340/825.72, 825.69, 340/825.25, 825.22; 341/176, 20, 22, 26; 348/734

See application file for complete search history.

(56) References Cited

U.S. PATENT DOCUMENTS

| 4,039,784 | A | * | 8/1977 | Quarton et al. | ............... | 345/440 |
| 4,539,652 | A | * | 9/1985 | Rubin | ........................... | 710/100 |
| 5,892,459 | A | * | 4/1999 | Ishimura | ..................... | 340/5.54 |
| 6,876,678 | B1 | * | 4/2005 | Chow et al. | .................... | 370/538 |
| 7,023,498 | B2 | * | 4/2006 | Ishihara | ........................ | 348/734 |
| 2008/0012723 | A1 | * | 1/2008 | Wang | ........................ | 340/825.72 |

FOREIGN PATENT DOCUMENTS

| JP | 07-123115 | 5/1995 |
| JP | 08-221174 | 8/1996 |
| JP | 10-187583 | 7/1998 |
| JP | 11-239114 | 8/1999 |

OTHER PUBLICATIONS

Japanese Patent Office, Office Action for Application 2006-196190, Mail date Aug. 19, 2008.
Japanese Patent Office, Office Action for Application 2006-196191, Mail date Jul. 15, 2008.

\* cited by examiner

*Primary Examiner* — Anh-Vu Ly
*Assistant Examiner* — Mohammad Anwar
(74) *Attorney, Agent, or Firm* — SoCal IP Law Group LLP; Steven C. Sereboff; John E. Gunther

(57) ABSTRACT

A data processing circuit comprising: a first circuit configured to time-division-multiplex a first digital signal synchronous with a clock signal input from an external controller and a second digital signal asynchronous with the clock signal; and a second circuit configured to output a digital signal time-division-multiplexed by the first circuit to the controller.

15 Claims, 8 Drawing Sheets

DATA PROCESSING CIRCUIT AND DATA PROCESSING METHOD

CROSS-REFERENCE TO RELATED APPLICATION

This application claims the benefit of priority to Japanese Patent Application Nos. 2006-196190 and 2006-196191, filed Jul. 18, 2006 and Jul. 18, 2006, respectively, of which full contents are incorporated herein by reference.

BACKGROUND OF THE INVENTION

1. Field of the Invention

The present invention relates to a data processing circuit and a data processing method.

2. Description of the Related Art

FIG. 10 illustrates the configuration of a data input processing system 1 that is applied to car audio systems or the like. The data input processing system 1 includes a main device 10 and a display device 20 that is detachable from the main device 10.

The main device 10 is equipped with mechanisms and circuits to achieve the functions of a car audio system such as a CD or DVD player, a radio receiver, etc. On the other hand, the display device 20 is provided with a display panel 21 to indicate information on the control or the operation of the car audio system, a data input processing circuit 22, a key scanning circuit 23, a rotary encoder 24, and a remote control receiver 25.

The main device 10 is equipped with a controller 11 to control indication on the display panel 21, and to receive signals from the key scanning circuit 23, the rotary encoder 24, and the remote control receiver 25. The controller 11 inputs a clock signal CL, a data input signal DI, and a chip enable signal CE to an input interface 221 in the display device 20 for the display control or for the reception of the signals.

The input processing circuit 22 in the display device 20 includes the input interface 221 that communicates with the controller 11, a control register 222 that memorizes input data that is input from the controller 11, a display control unit 223 that controls the display panel 21 based on display data that is input as the input data, a signal generating unit 224 that provides a driving signal such as an operational clock signal for the display control unit 223, and a signal selecting circuit 225 that selects either a key scanning signal or a rotary encoder detecting signal (hereinafter, these are collectively referred to as a slow processing signal), corresponding to the address data that is input from the controller 11 as a data-output request to be memorized at the control register 222, and that outputs the selected slow processing signal.

The display device 20 is also equipped with a circuit (e.g., remote control receiver 25) that generates a signal with a short sampling period (hereinafter, referred to as a fast processing signal). The fast processing signal cannot be synchronized with a clock signal that is input from the main device 10 due to the insufficient processing capacity of a processor mounted on the display device 20, and therefore, it is output to the main device 10 via an independent signal line different from a signal line for the slow processing signals. (refer to Japanese Patent Application Laid-Open Publication No. 8-221174)

In the case, as above, that individual signal lines to output a fast processing signal and a slow processing signal are arranged independently, the number of lines to connect the main device 10 and the display device 20 increased, and thus wiring becomes complicated. Thereby, the possibility of such a trouble as a faulty connection increases, and the manufacturing cost also increases due to the increased number of parts.

SUMMARY OF THE INVENTION

A data processing circuit according to an aspect of the present invention, comprises: a first circuit configured to time-division-multiplex a first digital signal synchronous with a clock signal input from an external controller and a second digital signal asynchronous with the clock signal; and a second circuit configured to output a digital signal time-division-multiplexed by the first circuit to the controller.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

In a data input processing circuit and a controller that are applied to a car audio system, etc. including a main device and a display device separate therefrom, a signal with a long sampling period that is output from a key scanning circuit or a rotary encoder and a signal with a short sampling period that is output from a remote control unit are output to the controller via a small number of signal lines, both the above signals being output from the data input processing circuit included in the display device to the controller included in the main device.

Outputting a slow processing signal (first digital signal) and a fast processing signal (second digital signal) to the controller by time-division multiplexing, it is possible to output the slow processing signal and the fast processing signal to the controller via a small number of signal lines. Thereby, it is possible to attain simple wiring, to reduce the possibility of a trouble such as a faulty connection, and to reduce manufacturing costs as the result of a reduced number of parts.

First Embodiment

Figure 1:
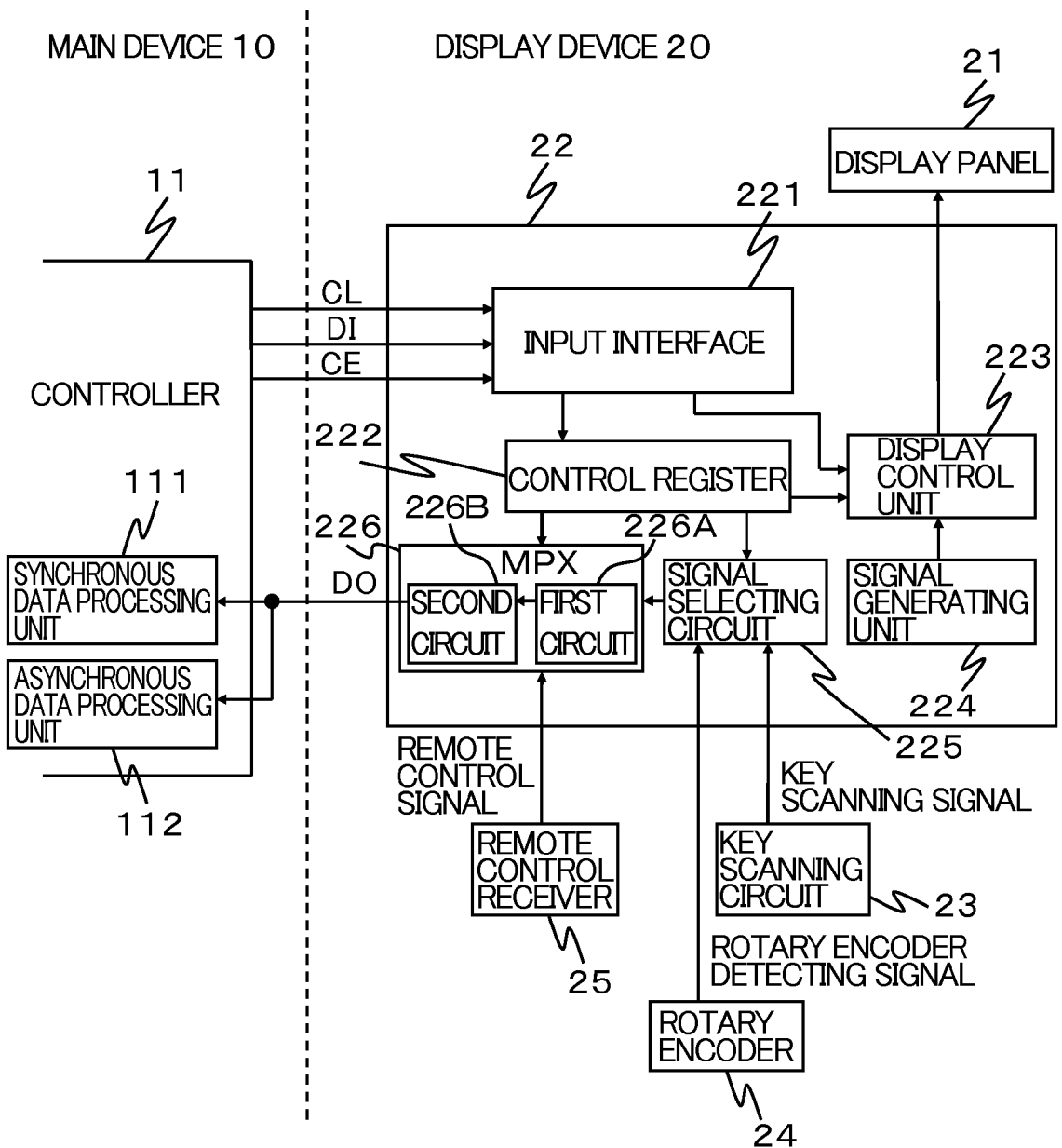
FIG. 1 is a schematic view illustrating a configuration of a data input processing system 1 according to an embodiment of the present invention.

An embodiment according to the present invention will be explained hereinafter. FIG. 1 illustrates the configuration of a data input processing system 1 that is applied to a car audio system to be explained as an embodiment of the present invention. The data input processing system 1 includes a main device 10 and a display device 20 that is separable from the main device 10.

The main device 10 includes mechanisms and circuits to achieve the functions of a car audio system such as a CD or DVD player, a radio receiver, etc. The display device 20 includes a display panel 21 to indicate information on the control or the operation of the car audio system, a data input processing circuit 22, a key scanning circuit 23, a rotary encoder 24, and a remote control receiver 25.

Figure 2:
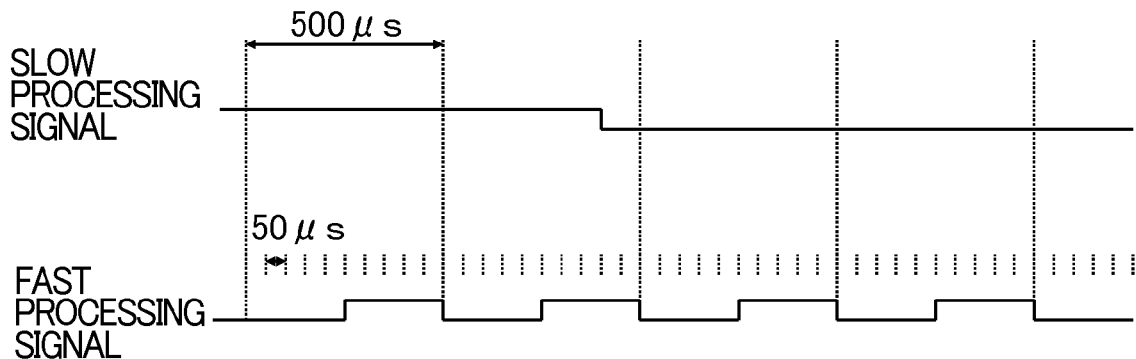
FIG. 2 is a timing chart showing examples of a slow processing signal and a fast processing signal according to an embodiment of the present invention.

In the following explanation, a digital signal with a long sampling period as a signal that is output from the key scanning circuit 23 or the rotary encoder 24 is referred to as a slow processing signal (first digital signal), and a digital signal with a short sampling period as a signal that is output from the remote control receiver 25 is referred to as a fast processing signal (second digital signal). In this embodiment, the sampling period of a slow processing signal is assumed to be 500 µs and the sampling period of a fast processing signal is assumed to be 50 µs (see FIG. 2). That is, the sampling period of the slow processing signal by a controller 11 is longer than the sampling period of the fast processing signal by the controller 11.

The main device 10 is equipped with the controller 11 for the display control of the display panel 21 and for the reception of signals from the key scanning unit 23, the rotary encoder 24, and the remote control receiver 25. The controller 11 and an input interface 221 are connected by three signal lines. The controller 11 inputs a clock signal CL, a data input signal DI, and a chip enable signal CE to the input interface 221 in the display device 20 via the signal lines for the display control or for the reception of the signals. The controller 11 and a multiplexer 226 are connected by a single signal line, and output data DO is output from the multiplexer 226 to the controller 11 via the signal line.

The controller 11 is equipped with a synchronous data processing unit 111 to process a slow processing signal and an asynchronous data processing unit 112 to process a fast processing signal, that are input as the output data DO from the display device 20. The slow processing signal is input to the synchronous data processing unit 111 being synchronized with the clock signal CL. On the other hand, the fast processing signal is input to the asynchronous data processing unit 112 by digital-through, being asynchronous with the clock signal CL. The digital-through means that an input signal is output both without modification in its wave form and without synchronization. The asynchronous data processing unit 112 processes the fast processing signal, that is input by the digital-through, at a sampling frequency equal to or higher than a predetermined sampling period for the fast processing signal (50 µs).

The data input processing circuit 22 in the display device 20 includes the input interface 221, a control resister 222, a display control unit 223, a signal generating unit 224, a signal selecting circuit 225, and the multiplexer (MPX) 226. The input interface 221 receives the clock signal CL, the data input signal DI, and the chip enable signal CE that are input from the main device 10, and stores the data, that is input as the input signal DI, in the control register 222.

Figure 3:
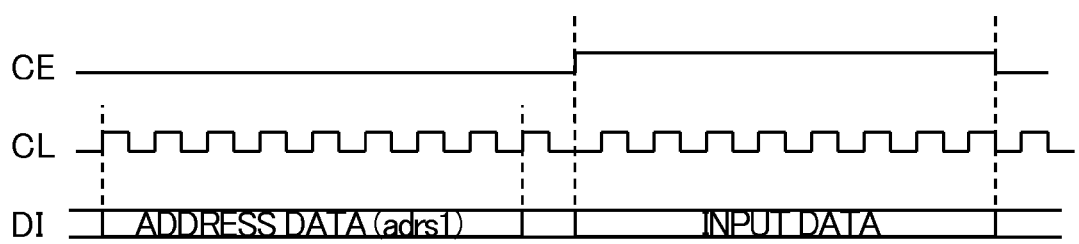
FIG. 3 is a timing chart showing an operation of an input interface 221 when input data is input from a main device 10 according to an embodiment of the present invention.

FIG. 3 is a timing chart showing the operation of the input interface 221 when input data is input from the main device 10. In this case, the data input signal DI includes an address data (adrs1) and the input data. The input data includes, e.g., display data that is described later and flags that are referred to when the multiplexer 226 selects one out of a plurality of fast processing signals.

Figure 4:
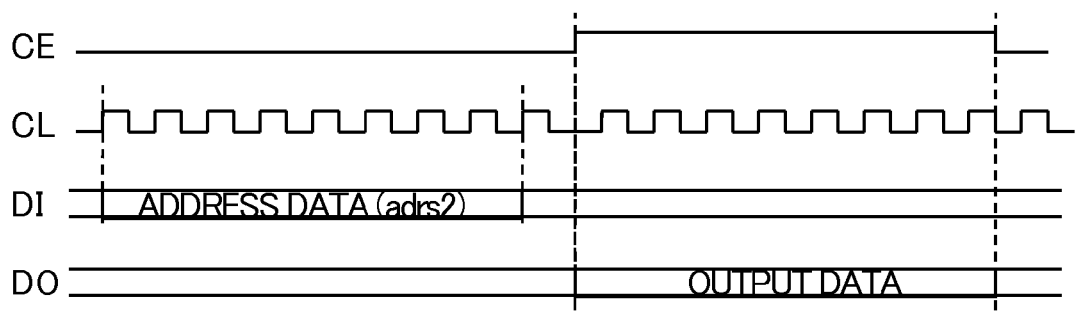
FIG. 4 is a timing chart showing an operation of an input interface 221 when a data-output request is made, according to an embodiment of the present invention.

FIG. 4 is a timing chart showing the operation of the input interface 221 and the multiplexer 226 when a data-output request is made by the main device 10. In this case, an address data (adrs2) designating a slow processing signal to be requested to be output, is input as the data input signal DI. The multiplexer 226 then outputs the output data DO corresponding to the address data (adrs2) to the main device 10.

The display control unit 223 in the data input processing circuit 22 controls the display panel 21 based on display data that is input as input data from the main device 10 and is memorized at the control register 222. The signal generating unit 224 provides a drive signal to the display control unit 223.

The signal selecting circuit 225 selects a slow processing signal (key scanning signal or rotary encoder detecting signal), that corresponds to the address data (adrs2) that is input from the main device 10 as a data-output request and is memorized at the control register 222, and outputs the selected slow processing signal to the multiplexer 226. The signal selecting circuit 225 is a parallel/serial converting circuit, and a slow processing signal is input to the signal selecting circuit 225 as a parallel signal, and the slow processing signal that is output from the signal selecting circuit 225 is input to the multiplexer 226 as a serial signal that is synchronous with the clock signal CL.

The multiplexer 226 includes a first circuit 226A that multiplexes a slow processing signal input from the signal selecting circuit 225 and a fast processing signal input from the remote control receiver 25 by time-division multiplexing, and a second circuit 226B that outputs a time-division multiplexed signal to the main device 10 as the output data DO. The output periods of the slow and the fast processing signals, that include a single frame of the time-division multiplex, can be preset at the multiplexer 226. Here, the single frame is assumed to be 500 µs, and the output period of the slow processing signal is assumed to be set at 50 µs and the output period of the fast processing signal is assumed to be set at 450 µs.

Figure 5:
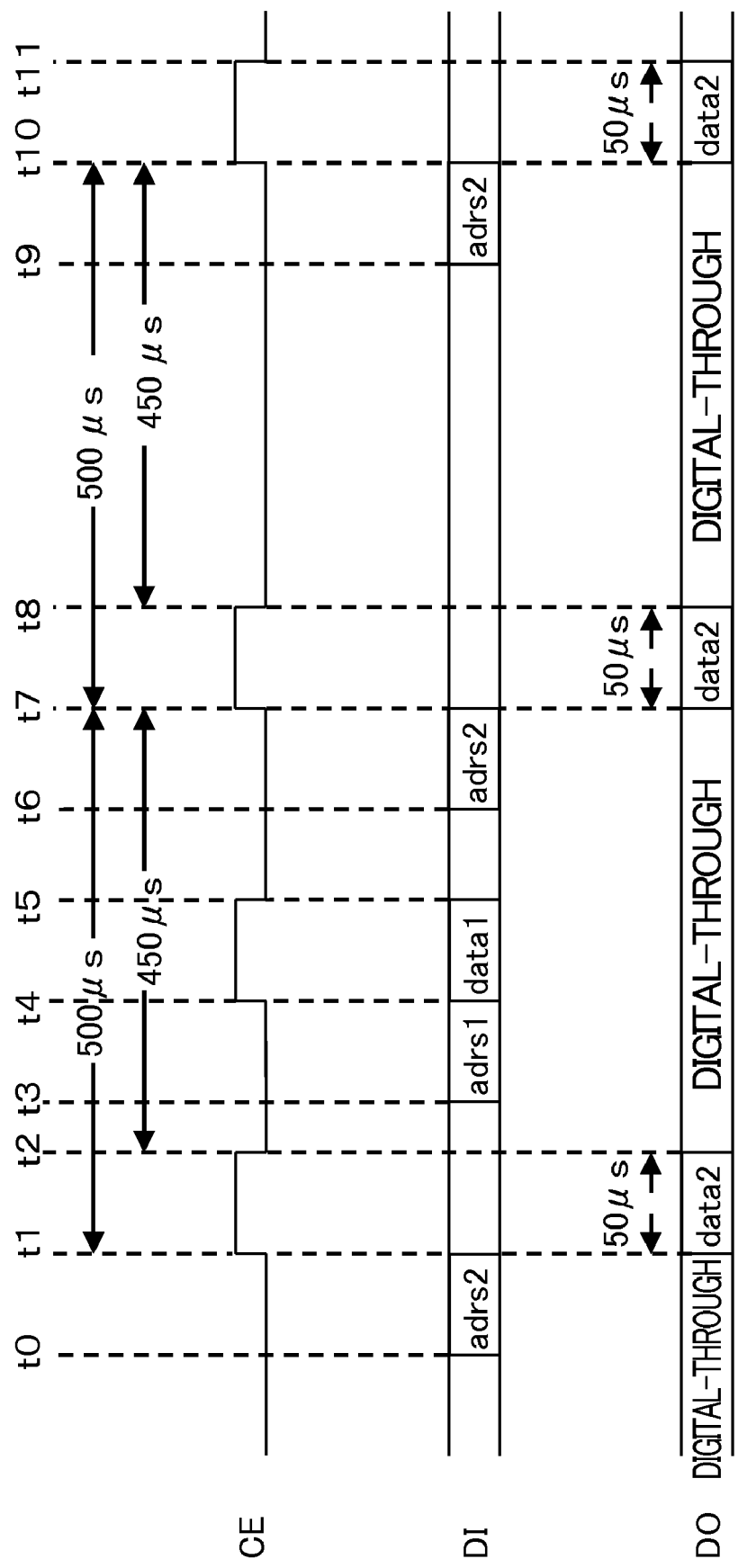
FIG. 5 is a timing chart showing a temporal relationship among a chip enable signal CE, a data input signal DI that are input from a main device 10, and output data DO that is output from a multiplexer 226, according to an embodiment of the present invention.

FIG. 5 is a timing chart showing the temporal relationship among the chip enable signal CE, the data input signal DI that are input from the main device 10, and the output data DO that is output from the multiplexer 226. An address data (adrs2) is first input as the data input signal DI, and thereby, the output request of a slow processing signal is made by the main device 10. In response to this, a slow processing signal (data2) is output as the output data DO (t1 to t2).

An address data (adrs1) and an input data are input from the main device 10 as the data input signal DI (t3 to t5).

The address data (adrs2) is input from the main device 10 as the data input signal DI, and thereby, the output request of the slow processing signal is made by the main device 10 (t6 to t7), and in response to this, the slow processing signal (data2) is output as the output data DO (t7 to t8).

The address data (adrs2) is input from the main device 10 as the data input signal DI, and thereby, the output request of the slow processing signal is made by the main device 10 (t9 to t10), and in response to this, the slow processing signal (data2) is output as the output data DO (t10 to t11).

As shown in the figure, the multiplexer 226 outputs a fast processing signal by the digital-through as the output data DO during the period other than the output period for a slow processing signal. That is, the multiplexer 226 outputs the slow processing signal in response to a request from the controller 11, and outputs the fast processing signal during a period except a period when the slow processing signal is output.

Thus the data input processing system 1 has a mechanism to transmit a slow processing signal from the key scanning circuit 23 or the rotary encoder 24 and a fast processing signal from the remote control receiver 25 through a single serial signal line by time-division multiplexing. Hence the number of signal lines connecting the main device 10 and the display device 20 can be reduced, and simple wiring is attained. A trouble such as a faulty connection is also diminished, and manufacturing costs are reduced as the result of a reduced number of parts.

Periods other than output periods for a slow processing signal in time-division multiplexing, i.e., output periods for a fast processing signal by the digital-through can be utilized as periods for data input from the controller 11 to the input interface 221. For a concrete example, the periods can be utilized as periods for display data input from the controller 11 to the input interface 221, and thereby, the display data can be efficiently input from the main device 10 to the display device 20.

In the case that no output request for a slow processing signal is made by the main device 10 during an output period for a slow processing signal, the output period for the slow processing signal may be utilized to output a fast processing signal. That is, if no request is made to output the slow processing signal from the controller 11, the multiplexer 226 outputs the fast processing signal during a period when the slow processing signal should be output. Such this mechanism can be realized, for example, in the case that any output request is not made, by inputting the address data (adrs1), that is for changing the setting of the output periods of time-division multiplex, from the controller 11 to the display device 20, and thereby, changing the output period for time-division multiplex from the multiplexer 226. With such a mechanism, a fast processing signal can be efficiently output to the controller 11.

Second Embodiment

Since a fast processing signal from a remote control receiver 25 is input to a multiplexer 226 only when a remote controller is operated, a fast processing signal does not need to be output unless a fast processing signal is input. Therefore, it is preferred to halt the digital-through output of a fast processing signal in this case, from the viewpoint of the reduction of processing load on and of electric power consumption by the multiplexer 226.

Figure 6:
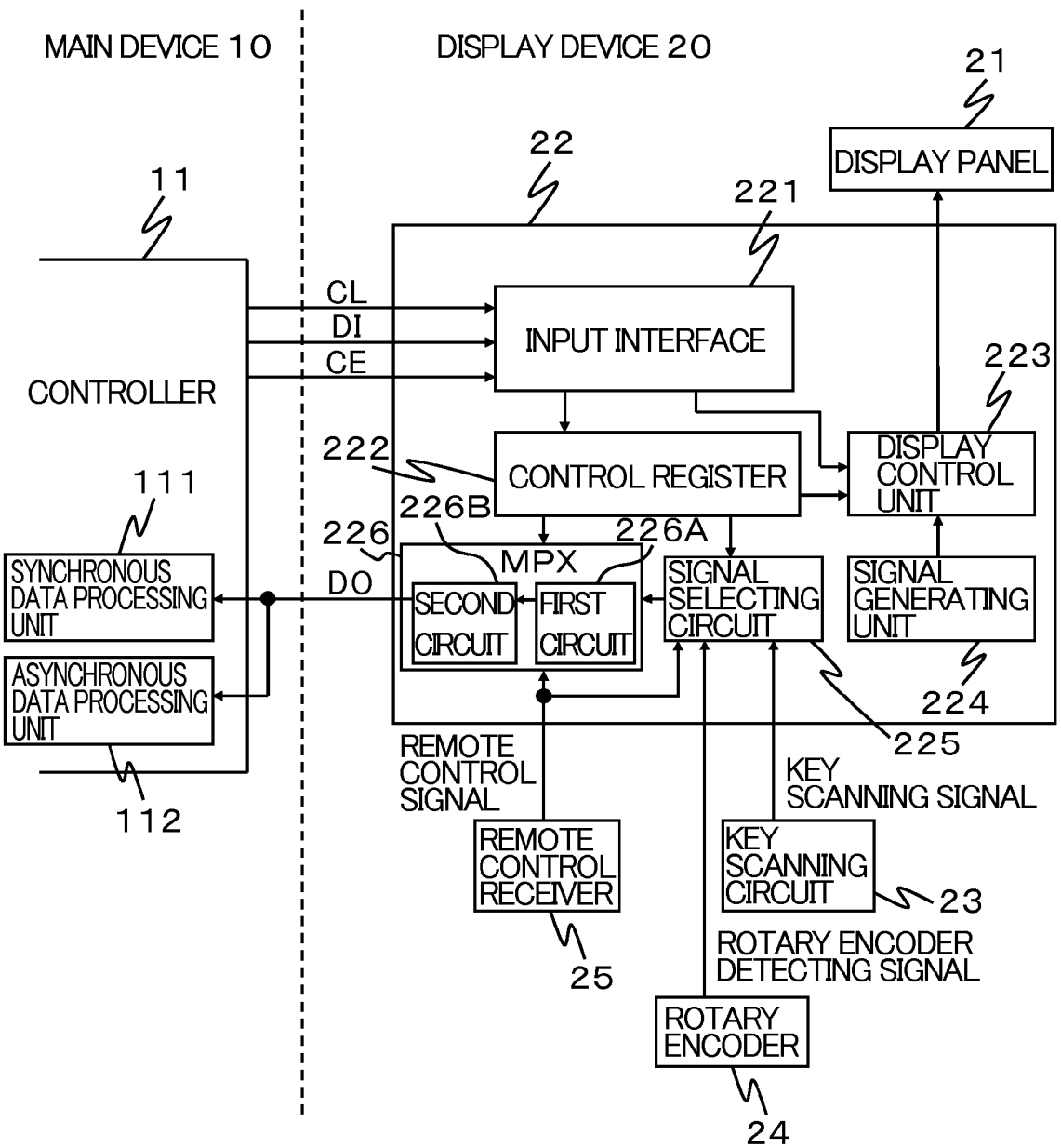
FIG. 6 is a schematic view illustrating a configuration of a data input processing system 1 according to an embodiment of the present invention.

By the mechanism explained below, it is attained that a fast processing signal is output from the multiplexer 226 only when there is a signal input from the remote control receiver 25. FIG. 6 illustrates the configuration of a data input processing system 1 with the mechanism.

As shown in the figure, in the data input processing system 1, a remote control signal, that is output from the remote control receiver 25, is input not only to the multiplexer 226 but also to a signal selecting circuit 225. On the occasion of the output of a remote control signal from the remote control receiver 25, a slow processing signal that is synchronizable (hereinafter, referred to as a synchronous signal) by the signal selecting circuit 225 is output. The slow processing signal is, e.g., a signal that shifts between "High" and "Low" states at a frequency that allows sampling by the signal selecting circuit 225, or a signal at a continuous "High" state for a predetermined period.

Figure 7:
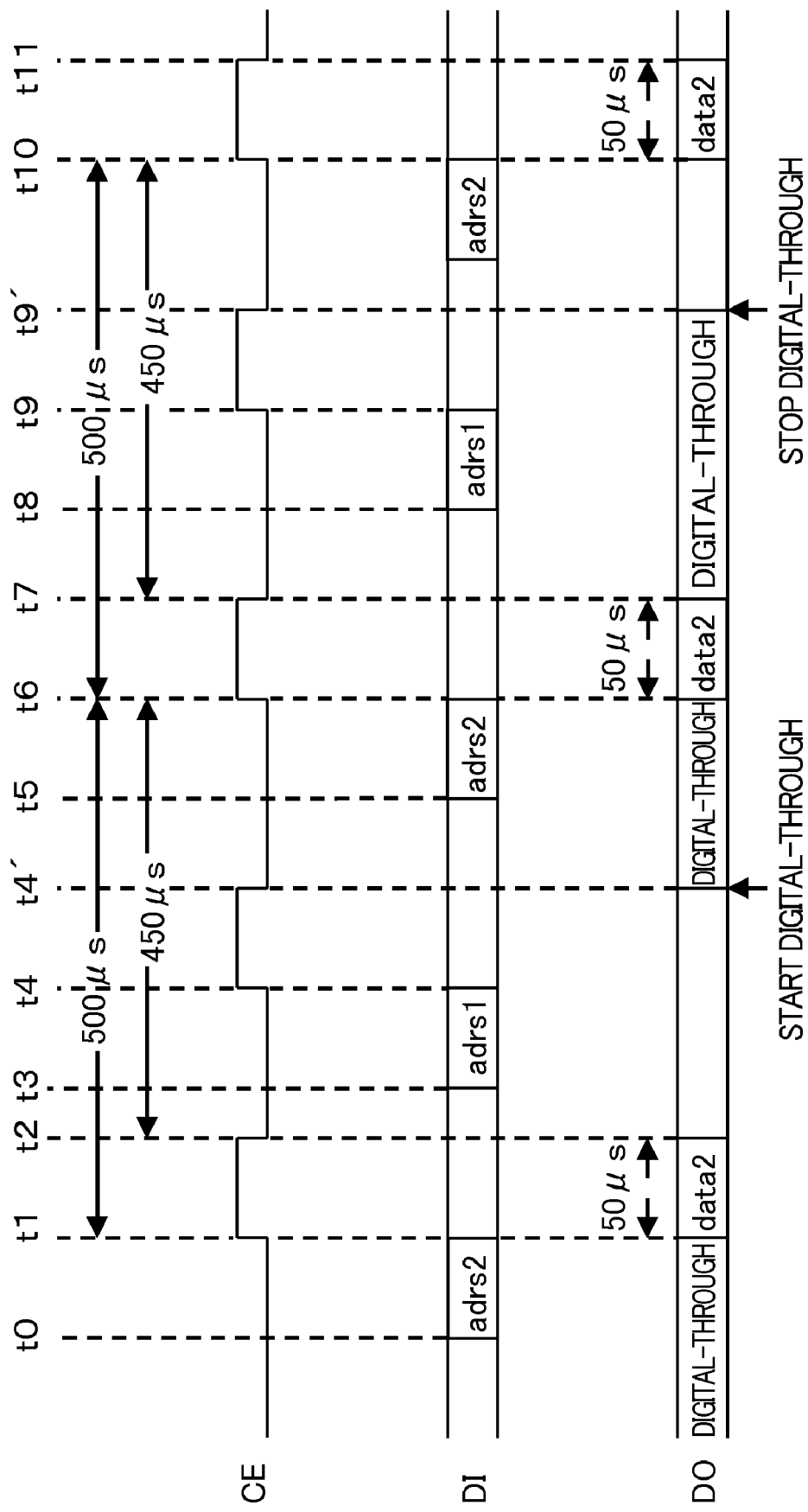
FIG. 7 is a timing chart showing the concrete operation of a data input processing system 1 according to an embodiment of the present invention.

The specific operation of the data input processing system 1 is explained referring to FIG. 7. As shown in FIG. 6, a remote control signal that is output from the remote control receiver 25 is also input to the signal selecting circuit 225.

As shown in FIG. 7, a controller 11 inputs an address data (adrs2) indicating that the signal selecting circuit 225 is required to output a remote control signal input from the remote control receiver 25 at a predetermined timing, to an input interface 221 (t0 to t1). In the case that a synchronous signal is output according to the output of the remote control signal during an output period corresponding to the address data (adrs2), the synchronous signal is output as the output data DO (data2) from the multiplexer 226 to the controller 11 (t1 to t2).

When a synchronous signal is input, the controller 11 inputs an address data (adrs1) indicating that the multiplexer 226 is required to start the digital-through output of a remote control signal by time-division multiplexing, to the input interface 221 (t3 to t4). Thereby, the multiplexer 226 starts the digital-through output of a fast processing signal that is time-division multiplexed with a slow processing signal, at the time t4' when a chip enable signal CE falls.

During the period of t5 to t6, the address data (adrs2) designating a slow processing signal to be requested to be output, is input as a data input signal DI, and corresponding to the address data (adrs2), the slow processing signal is output as the output data DO from the multiplexer 226 to the main device 10 (t6 to t7).

When the input of a fast processing signal is stopped, the controller 11 inputs an address data (adrs1) indicating that the multiplexer 226 is required to halt the digital-through output of a remote control signal by time-division multiplexing, to the input interface 221 (t8 to t9). Thereby, the multiplexer 226 stops the digital-through output of the fast processing signal that is time-division multiplexed with the slow processing signal, at the time t9' when a chip enable signal CE falls.

Employing the above mechanism, a fast processing signal is output from the multiplexer 226 only when a signal is input from the remote control receiver 25 (third circuit). Thereby, processing load on and power consumption by the multiplexer 226 can be reduced.

Third Embodiment

In the case, for example, that a plurality of remote control signals are input, or that another fast processing signal such as a USB signal or the like exists, a plurality of fast processing signals may need to be output to a main device 10 depending upon the configuration of a data input processing system 1. In such the cases, employing the following mechanism for example, the plurality of fast processing signals are output to the main devise 10 through a single signal line for the output data DO.

Figure 8:
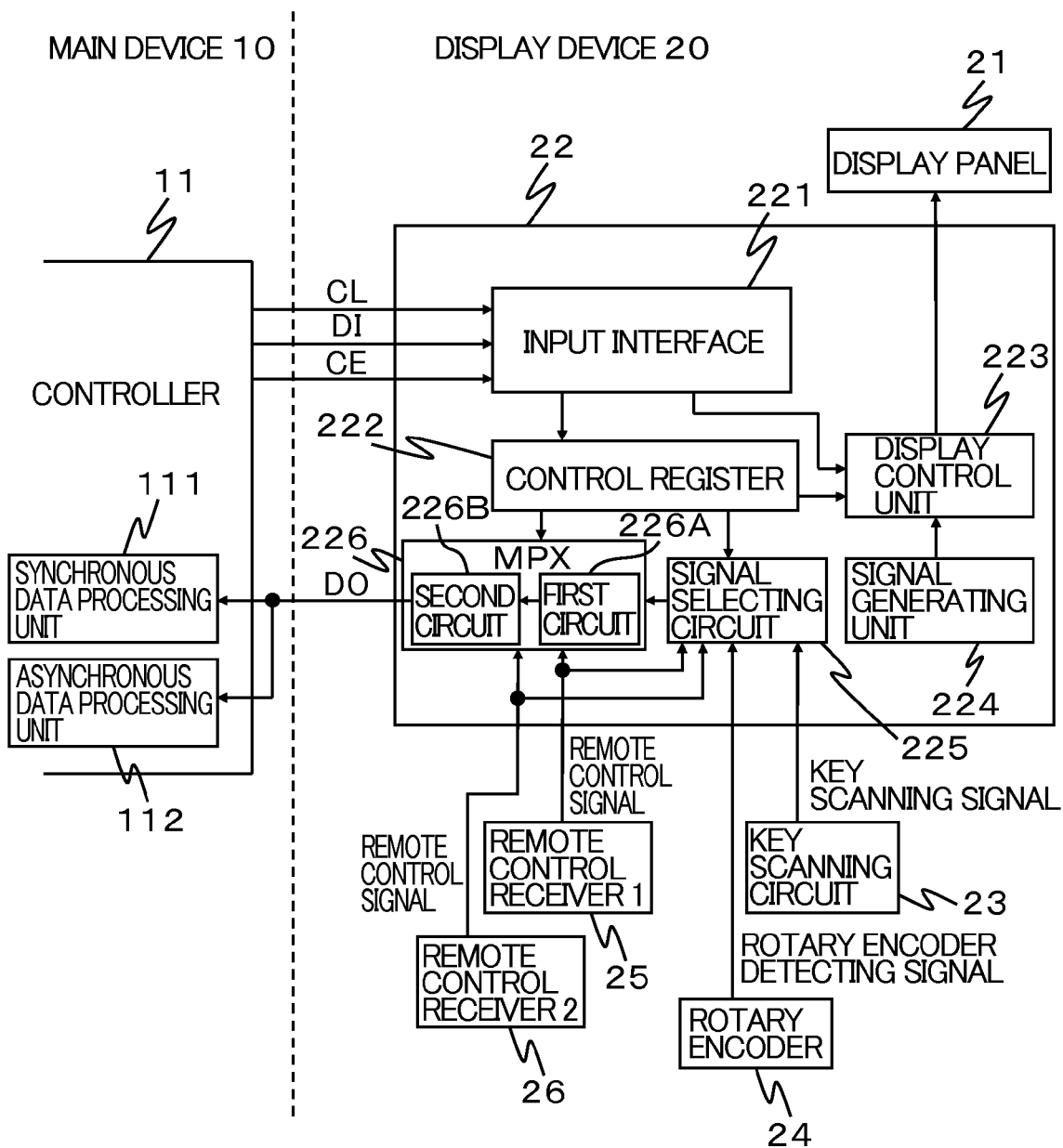
FIG. 8 is a schematic view illustrating a configuration of a data input processing system 1 according to an embodiment of the present invention.

FIG. 8 illustrates the configuration of a data input processing system 1 to explain the mechanism. As shown in the figure, in the data input processing system 1, two remote control signals that are output from two remote control receivers 25 and 26 are input to a multiplexer 226. As the case in the second embodiment, the remote control signals are also input to a signal selecting circuit 225.

Figure 9:
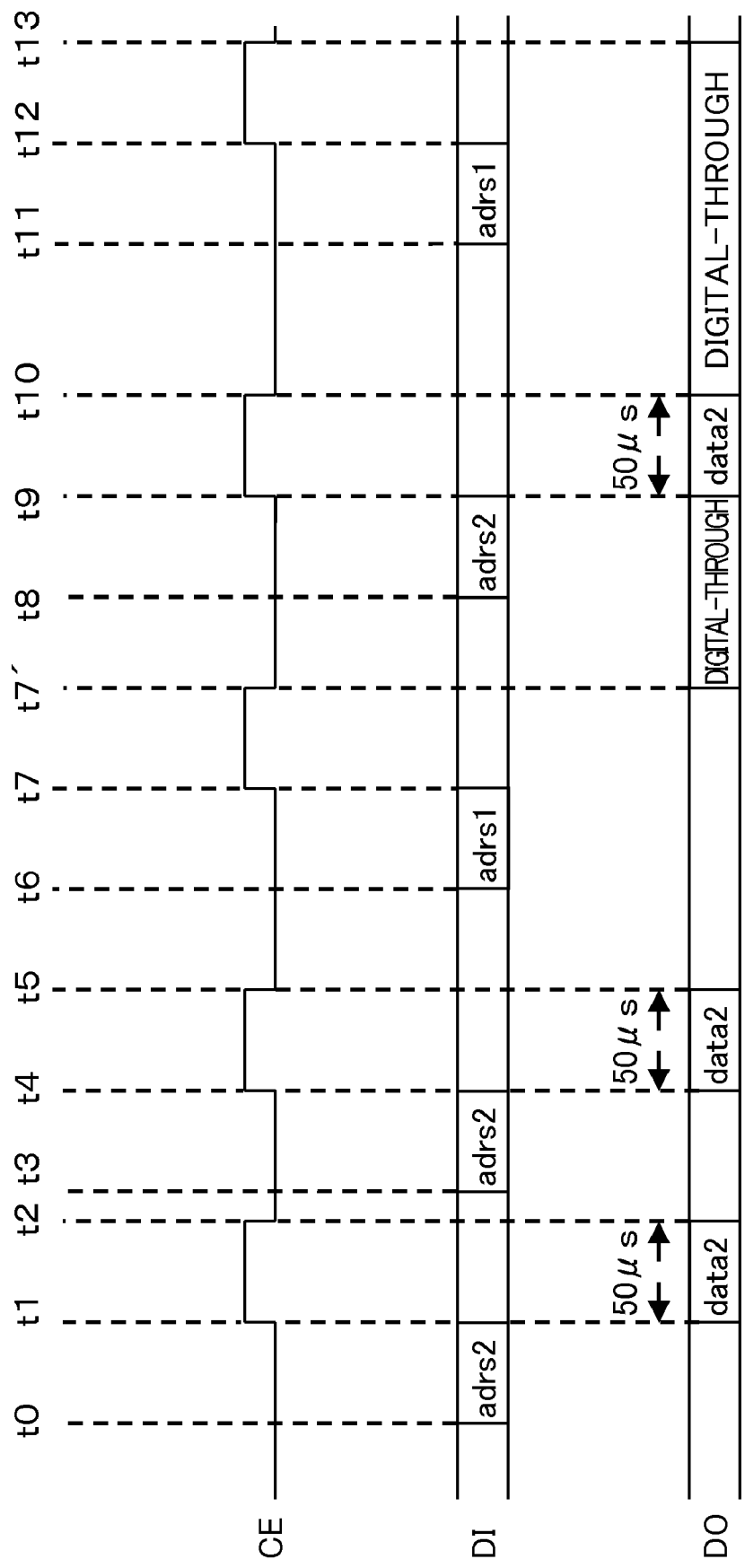
FIG. 9 is a timing chart showing an operation of a data input processing system 1 according to an embodiment of the present invention.
Figure 10:
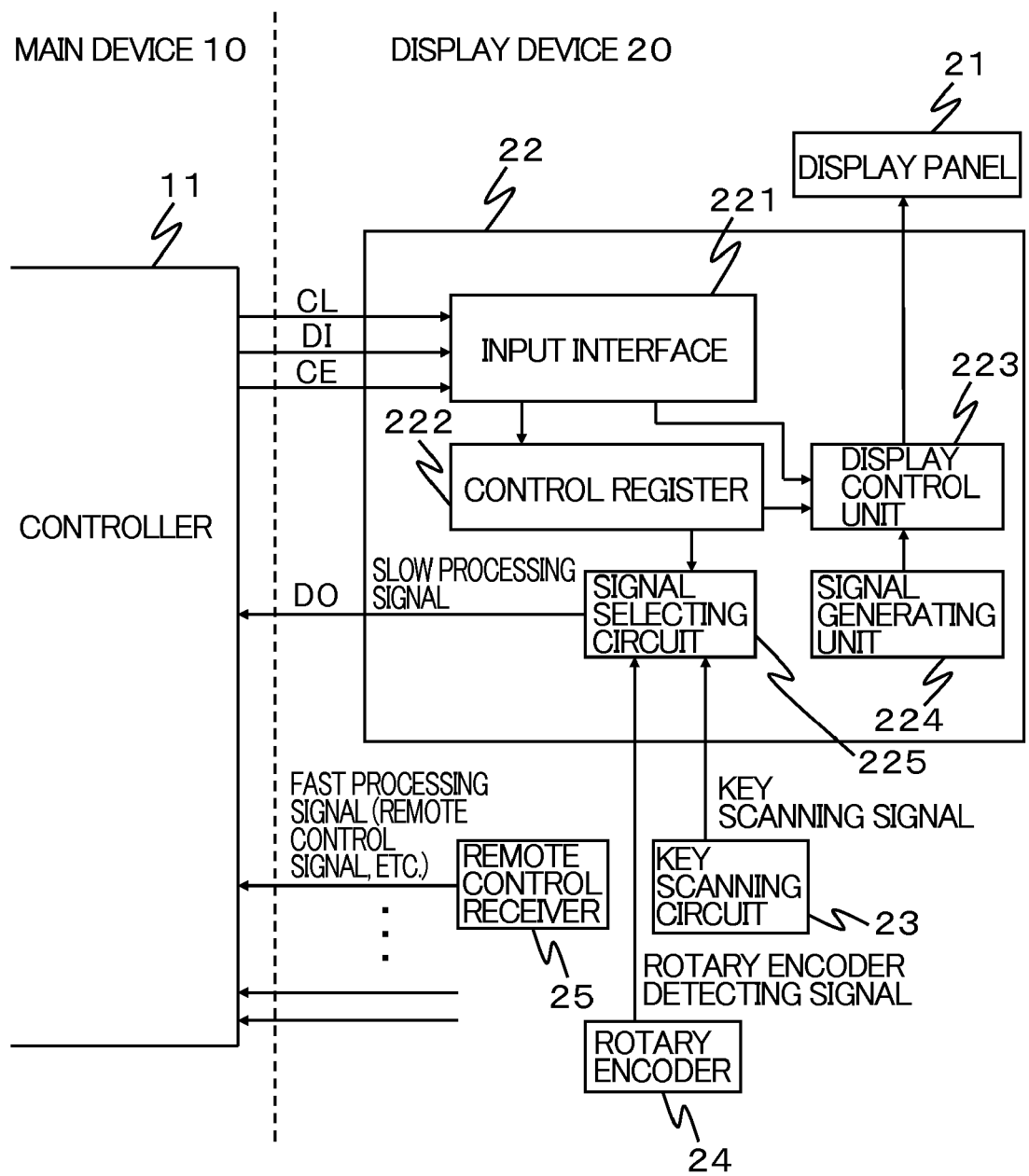
FIG. 10 is a schematic view illustrating a configuration of a data input processing system 1 applied to car audio systems or the like, according to an embodiment of the present invention.

FIG. 9 is a timing chart showing the operation of the data input processing system 1 in this embodiment. As shown in the figure, a controller 11 inputs an address data (adrs2) indicating that the signal selecting circuit 225 is required to output a signal from the remote control receiver 25 at a predetermined timing, to an input interface 221 (t0 to t1). The controller 11 also inputs the address data (adrs2) indicating that the signal selecting circuit 225 is required to output a signal from the remote control receiver 26 at a predetermined timing, to the input interface 221 (t3 to t4). As the case in the second embodiment, the controller 11 determines if a synchronous signal is output from either the remote control receiver 25 or 26 (third circuit). The controller 11 can determine which remote control receivers a synchronous signal is output from, since one of fast processing signals is designated by the above address data (adrs2).

In the case that a synchronous signal is output, the controller 11 inputs an address data (adrs1) indicating that a remote control receiver outputting the synchronous signal is required to start the digital-through output of a remote control signal, to the input interface 221 (t6 to t7). Thereby, the multiplexer 226 starts the digital-through output of a fast processing signal that is time-division multiplexed with the slow processing signal, from the remote control receiver which outputs the synchronous signal, at the time t7' when a chip enable signal CE falls.

When the input of a fast processing signal is stopped, the controller 11 inputs an address data (adrs1) indicating that the multiplexer 226 is required to halt the digital-through output of a remote control signal by time-division multiplexing, to the input interface 221 (t11 to t12). Thereby, the multiplexer 226 stops the digital-through output of the fast processing signal that is time-division multiplexed with the slow processing signal, at the time t13 when a chip enable signal CE falls.

Employing the above mechanism, even in the case that a plurality of fast processing signals need to be output to the main device 10, e.g., such a condition that a plurality of remote control signals are input or that another fast processing signal such as a USB signal or the like exists, a plurality of fast processing signals can be output to the main device 10 through a single signal line for the output data DO.

In the above embodiments, the number of fast processing signals is not limited as described above but larger numbers of fast processing signals may exist.

The above embodiments of the present invention are simply for facilitating the understanding of the present invention and are not in any way to be construed as limiting the present invention. The present invention may variously be changed or altered without departing from its spirit and encompass equivalents thereof. The number of slow processing signals is not limited to the above but larger numbers of slow processing signals may exist.

It is claimed:

1. A data processing circuit comprising:
a first circuit configured to select one of a first digital signal synchronous with a clock signal input from an external controller and a second digital signal asynchronous with the clock signal, the first circuit further configured to select the first digital signal in response to a request to output the first signal from the external controller, and to select the second digital signal except during periods when the first digital signal is selected;
a second circuit configured to output the selected one of the first digital signal and the second digital signal to the external controller, the first digital signal output synchronous with the clock and the second digital signal output asynchronous with the clock; and an input circuit configured to input data from the external controller synchronously with the clock signal during a period when the first circuit selects the second digital signal as the-signal output to the external controller; wherein
the first circuit is further configured to select the second digital signal during a period when the first digital signal should be output according to a preset schedule, if the request to output the first digital signal is not received from the external controller.

2. The data processing circuit of claim 1, further comprising:
a third circuit configured to determine when data is available for output as the second digital signal and, when data is available, to cause the second circuit to output to the external controller a synchronous signal, synchronized with the clock signal, indicating data is available, wherein
the second circuit is further configured to output the second digital signal to the external controller in response to a request to output the second digital signal received from the external controller after the external controller detects the synchronous signal.

3. The data processing circuit of claim 2, wherein
the second circuit is further configured to stop outputting the second digital signal in response to the case that the external controller does not detect the input of the second digital signal.

4. The data processing circuit of claim 1, wherein
a sampling period of the first digital signal by the external controller is longer than a sampling period of the second digital signal by the external controller.

5. The data processing circuit of claim 1, wherein
the first digital signal includes a plurality of first digital signals, and wherein
the data processing circuit further comprises:
a signal selecting circuit configured
to select one of the plurality of first digital signals, and
to input the first digital signal that is selected, to the first circuit.

6. The data processing circuit of claim 5, wherein
the second digital signal includes a plurality of second digital signals, and wherein
the signal selecting circuit is further configured
to select one of the plurality of second digital signals, and
to input the second digital signal that is selected, to the first circuit.

7. The data processing circuit of claim 1, wherein
the first digital signal is at least one of: a signal output from a key scanning circuit; and a signal output from a rotary encoder.

8. The data processing circuit of claim 1, wherein
the second digital signal is at least one of: a signal output from a remote control receiver; and a signal output from a USB device.

9. The data processing circuit of claim 1, further comprising:

a display control unit configured to control a display panel based on display data input from the controller.

10. A data processing method comprising the steps of:

selecting one of a first digital signal synchronous with a clock signal input from an external controller and a second digital signal asynchronous with the clock signal outputting the selected one of the first digital signal and the second digital signal to the external controller, the first digital signal output synchronous with the clock and the second digital signal output asynchronous with the clock; and inputting, from the external controller, data synchronous with the clock signal during a period when the second digital signal is output to the external controller, wherein the first digital signal is selected in response to a request to output the first digital signal from the external controller, the second digital signal is selected except during periods when the first digital signal is selected, and the second digital signal is selected during a period when the first digital signal should be output in accordance with a preset schedule, if the request to output the first digital signal is not received from the external controller.

11. The data processing method of claim 10, further comprising the steps of:

determining when data is available for output as the second digital signal, and when data is available, outputting to the external controller a synchronous signal synchronous with the clock signal indicating data is available, wherein the second digital signal is output to the external controller in response to a request to output the second digital signal received from the external controller after the external controller detects the synchronous signal.

12. The data processing method of claim 11, wherein outputting the second digital signal is stopped in response to the case that the external controller does not detect the input of the second digital signal.

13. The data processing method of claim 10, wherein a sampling period of the first digital signal by the external controller is longer than a sampling period of the second digital signal by the external controller.

14. The data processing method of claim 10, wherein the first digital signal is selected from a plurality of first digital signals.

15. The data processing method of claim 14, wherein the second digital signal is selected from a plurality of second digital signals.

* * * * *